April 18, 1950
H. J. BOWMAN
2,504,247
AIRBORNE EXTINGUISHING EQUIPMENT
Filed Oct. 21, 1947
2 Sheets-Sheet 1
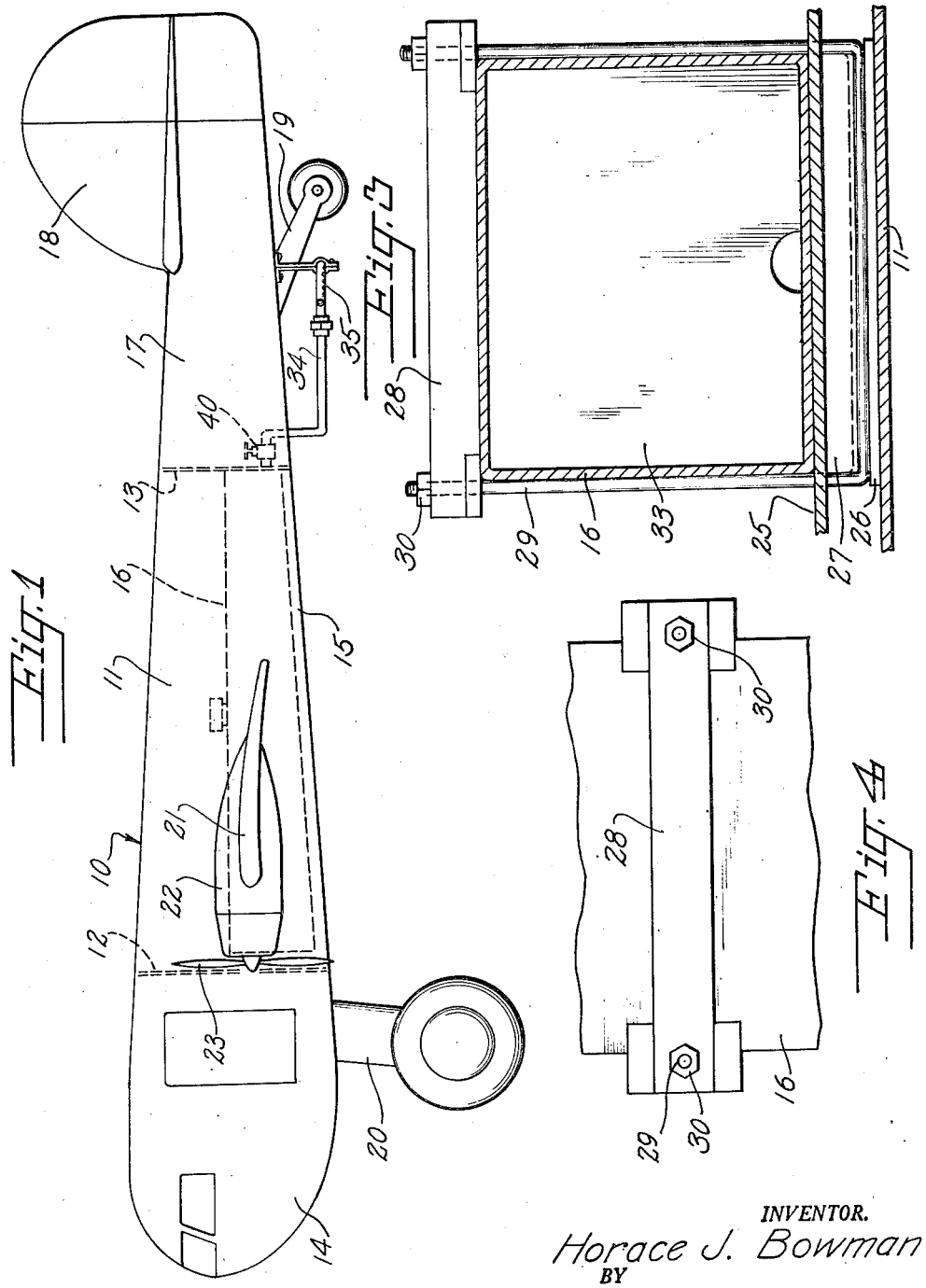
INVENTOR.
Horace J. Bowman
BY
McMorrow, Berman & Davidson
Attorneys

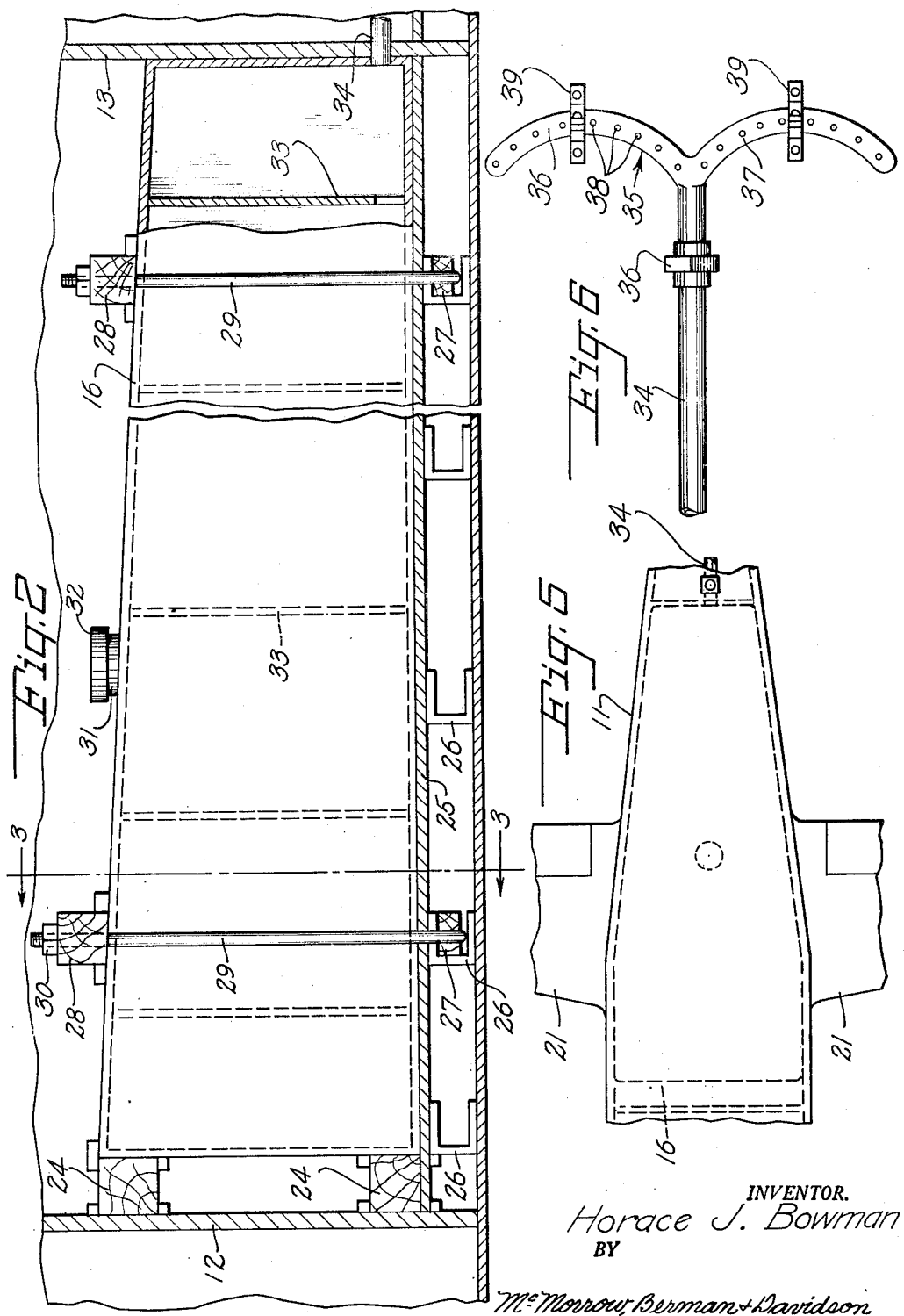

Patented Apr. 18, 1950

2,504,247

UNITED STATES PATENT OFFICE 2,504,247

AIRBORNE EXTINGUISHING EQUIPMENT

Horace J. Bowman, Los Angeles, Calif.

Application October 21, 1947, Serial No. 781,091

1 Claim. (Cl. 244—136)

This invention relates to improvements in fire extinguishing apparatus and more particularly to air borne apparatus especially adapted for combating forest fires or other conflagrations extending over a large area although it may be used for other purposes, such as spraying crops or distributing insecticides.

It is among the objects of the invention to provide air borne apparatus including a tank of large capacity securely mounted in a suitable aircraft in a manner to evenly distribute the loads imposed on the aircraft by the apparatus, and distributing means arranged to evenly and uniformly distribute the contents of the tank over a large area, the entire apparatus being of strong and durable construction and the distributing means being particularly braced and reinforced against aerodynamic forces and shaped to create a minimum aerodynamic drag.

Other objects and advantages will become apparent from a consideration of the following description in conjunction with the accompanying drawings wherein:

Figure 1 is a longitudinal elevation of a conventional aircraft showing the application thereto of fire extinguishing apparatus illustrative of the invention.

Figure 2 is a longitudinal cross section on an enlarged scale of a fragmentary portion of an aircraft fuselage showing, in longitudinal elevation, a liquid tank constituting a component of the improved fire extinguishing equipment mounted therein.

Figure 3 is a transverse cross section taken substantially on the line 3—3 of Figure 2.

Figure 4 is a top plan view of a fragmentary portion of the tank illustrated in Figures 2 and 3 showing the manner of applying a batten and hold-down rod to the tank.

Figure 5 is a top plan view of a fragmentary portion of the aircraft, on a reduced scale, showing the shape and location of the liquid tank therein, and Figure 6 is a bottom plan view of a fragmentary portion of a tubular liquid conduit and a spray head secured to one end of the conduit.

With continued reference to the drawings, the aircraft, generally indicated at 10, has a rearwardly tapered hollow fuselage 11 separated by transverse bulkheads 12 and 13 into a front compartment 14 in which is located the pilot compartment and other apparatus necessary to operation of the aircraft, a center compartment 15 in which is located an elongated tank 16 and a rear compartment 17 which carries the empennage 18 and the tail wheel structure 19. The aircraft is supported, when on the ground, by a suitable landing gear 20 positioned near the forward bulkhead 12 and is supported in the air by wings 21 carrying engine nacelles 22 and conventional propellers 23.

The tank 16 is an elongated hollow body of substantially square or rectangular cross sectional shape formed of suitable sheet material, such as sheet aluminum, is of a length to extend substantially from the forward bulkhead 12 to the rear bulkhead 13 and is somewhat tapered from the front to the rearward end thereof to more efficiently occupy the space within the center compartment of the tapered fuselage of the aircraft. As illustrated in Figure 2, the rear end of the tank 16 may abut the rear bulkhead 13 while the forward end is somewhat spaced from the forward bulkhead 12 and suitable wedges or spacers 24 are disposed between the forward end of the tank and the forward bulkhead to firmly position the tank in the center compartment against longitudinal movement relative to the fuselage of the aircraft.

The center compartment of the aircraft fuselage is provided with a cargo floor 25 supported upon a plurality of hollow transverse beams 26 which are disposed between the floor 25 and the bottom of the fuselage and are secured to the framework of the fuselage to constitute a substantial support for the floor 25. These beams 26 are preferably of channel shaped cross sections and may be disposed with one leg resting upon the bottom of the fuselage and the other leg underlying the surface of the floor 25. Suitable stiffeners 27 extend through some or all of the beams 26, the drawing illustrating the stiffeners extending through two of the beams disposed one near each end of the tank 16. These stiffeners may be conveniently provided as elongated members of wood and suitable battens 28, which also may be wooden members, extend transversely across the top of the tank immediately above respective stiffeners 27. U-shaped hold-down rods 29 have their intermediate portions extending through the beams provided with stiffeners 27 with the intermediate portions of the rods bearing against the under surfaces of the stiffeners. The ends of these rods are threaded and extend through corresponding apertures to the end portions of the battens 28 and are provided with nuts 30 which are screwed down against the top surfaces of the battens to firmly secure the tank 16 to the cargo floor of the aircraft and hold the tank against any tendency to move away from the floor.

The tank is provided in its upper wall with a filler spout 31 normally closed by a suitable cap 32 and has interially thereof spaced apart apertured baffles 33 which extend transversely of the tank and restrain liquid in the tank from surging from one end of the tank to the other.

A tubular conduit 34 is connected at its forward end to the rearward end of the tank 16, extending through the rear wall of the tank, the rear baffle 13 and the bottom of the fuselage and extending rearwardly below the fuselage, as illustrated in Figure 1, and a spray head, generally indicated at 35, is secured to the rearward end of the tubular conduit 34 by a suitable connection 36.

The spray head 35 comprises a pair of arcuately curved, hollow arms 37 extending in opposite directions from the rearward end of the tubular conduit 34 and disposed substantially horizontally when the aircraft is in a normal flying position. These arms 37 are provided in their lower sides with spaced apertures 38 through which liquid from the tank 16 is discharged. The spray head is secured to the under surface of the aircraft fuselage by suitable braces 39 and the tubular conduit 34 is provided in the rearward compartment 17 of the aircraft with a manually operated valve 40 by means of which flow of liquid from the tank 16 to the spray head 35 can be controlled.

There is thus provided a strong and durable fire extinguishing apparatus which can be easily installed in a conventional aircraft and firmly secured therein against movement relative to the aircraft by means which uniformly distribute the weight of the liquid tank over the cargo floor area of the aircraft and also place the weight in a balanced position relative to the sustaining surfaces of the aircraft, which apparatus can be quickly brought to the scene of a fire and will quickly discharge a large quantity of water or other fire extinguishing liquid over a large area to assist in combatting large fires such as forest fires. The apparatus may also be used for distributing fungicide or insecticide solutions upon trees or crops but it is contemplated that its main utility is in combatting forest or brush fires where it is necessary to quickly dampen the fire over a large area in order to bring it under control.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed is:

In combination with an aircraft having spaced apart bulkheads and a cargo floor extending between said bulkheads and hollow, transverse beams spaced apart below said floor supporting the same, a tank of generally rectangular cross section resting upon said floor and extending substantially from one of said bulkheads to the other, spacers disposed between one of said bulkheads and the adjacent end of said tank securing said tank against longitudinal movement relative to said aircraft, stiffeners extending through at least two of said hollow beams, battens extending across the top of said tank above said stiffeners, U-shaped rods extending below said stiffeners and secured at their ends to said battens to secure said tank against movement away from said floor, spaced baffles extending transversely of said tank to restrain fluid in said tank against surging, a tubular conduit extending from the rear end of said tank and below the rearward portion of said aircraft, and a sprinkler head at the rearward end of said conduit.

HORACE J. BOWMAN.

REFERENCES CITED

The following references are of record in the file of this patent:

UNITED STATES PATENTS

| Number | Name | Date |
|---|---|---|
| 1,278,170 | Koltko | Sept. 10, 1918 |
| 1,604,290 | King | Oct. 26, 1926 |
| 1,616,008 | Stout | Feb. 1, 1927 |
| 1,644,279 | Romine | Oct. 4, 1927 |
| 1,920,917 | Scales | Aug. 1, 1933 |
| 1,997,669 | Arcieri | Apr. 16, 1935 |
| 2,472,623 | Schulze | June 7, 1949 |